Figure 1:
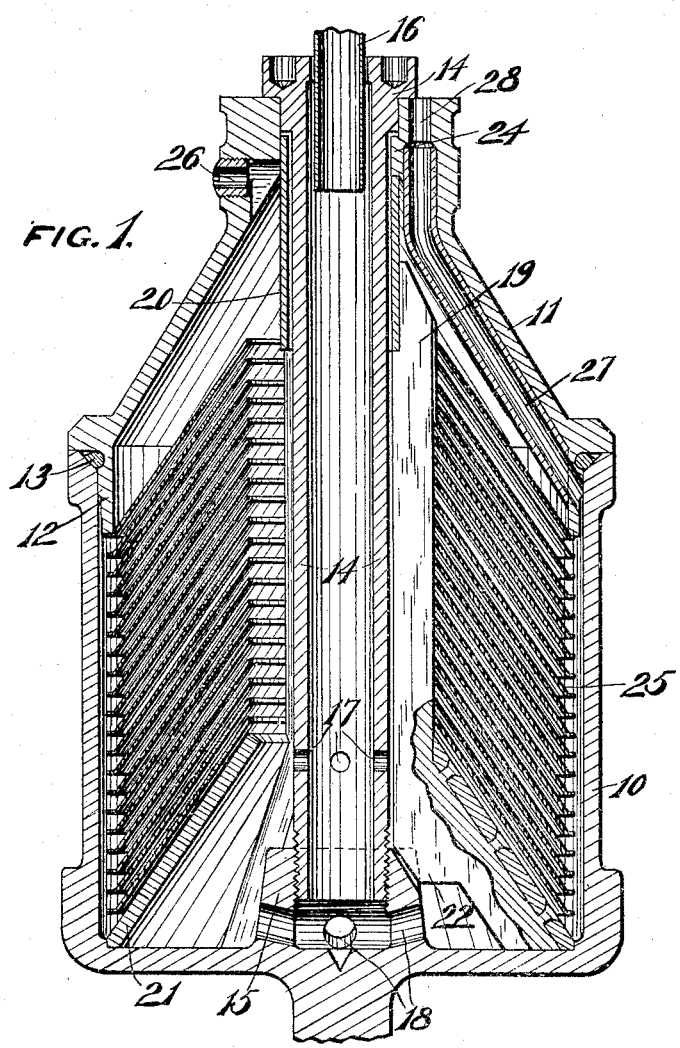

C. H. SHAW.
HOLLOW SHAFT FOR CENTRIFUGAL SEPARATORS.
APPLICATION FILED JAN. 21, 1909.

959,030.

Patented May 24, 1910.
2 SHEETS—SHEET 1.

WITNESSES.

INVENTOR.
Charles H. Shaw,
By Benedict, Morsell & Caldwell
ATTORNEYS.

C. H. SHAW.
HOLLOW SHAFT FOR CENTRIFUGAL SEPARATORS.
APPLICATION FILED JAN. 21, 1909.
959,030.
Patented May 24, 1910.
2 SHEETS—SHEET 2.
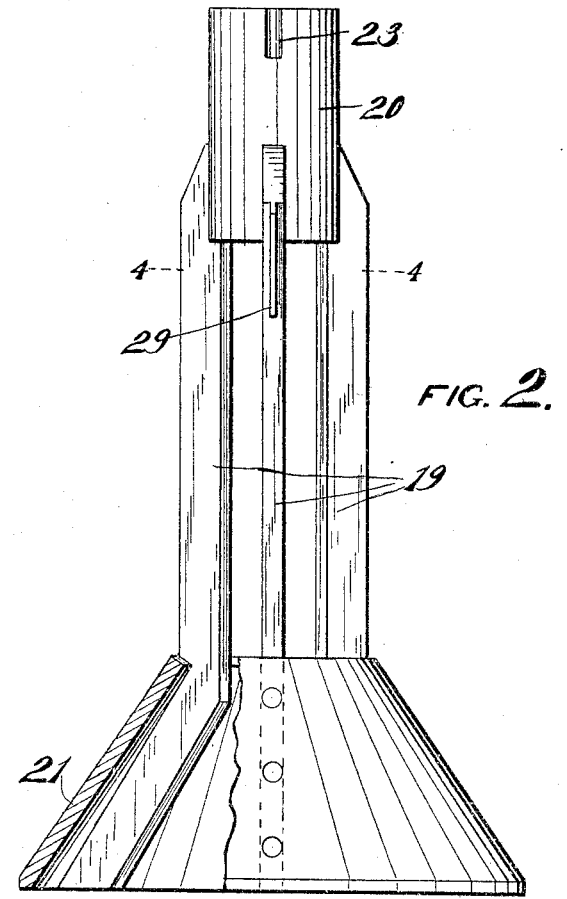
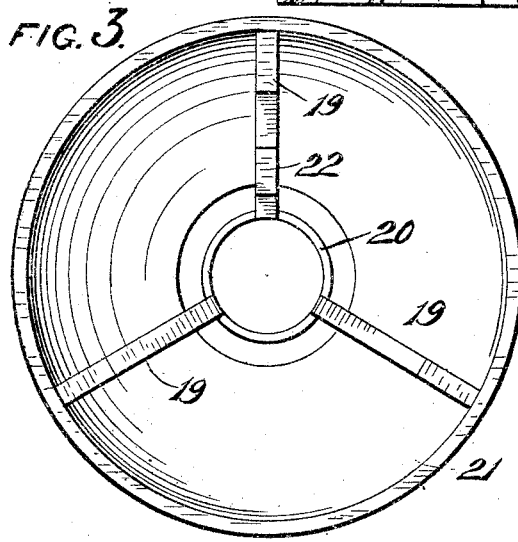
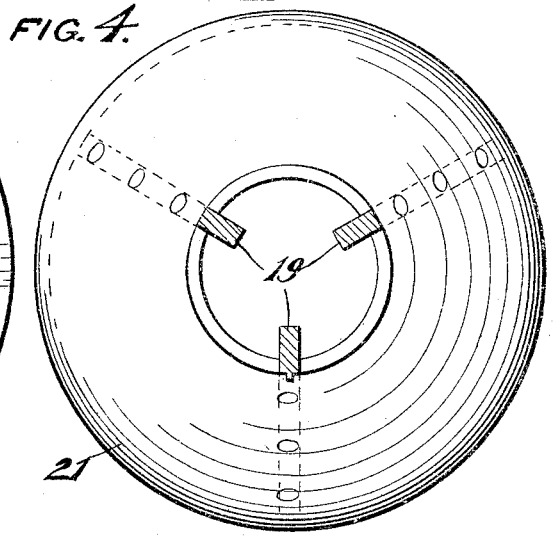

UNITED STATES PATENT OFFICE.

CHARLES H. SHAW, OF MILWAUKEE, WISCONSIN, ASSIGNOR TO STANDARD SEPARATOR COMPANY, A CORPORATION OF NEW JERSEY.

HOLLOW SHAFT FOR CENTRIFUGAL SEPARATORS.

959,030. Specification of Letters Patent. Patented May 24, 1910.

Application filed January 21, 1909. Serial No. 473,413.

*To all whom it may concern:*

Be it known that I, CHARLES H. SHAW, residing in Milwaukee, in the county of Milwaukee and State of Wisconsin, have invented new and useful Improvements in Hollow Shafts for Centrifugal Separators, of which the following is a description, reference being had to the accompanying drawings, which are a part of this specification.

This invention has for its object to provide a hollow shaft for centrifugal separators which will be open throughout the main portion thereof so as to be freely accessible for cleaning.

With this object in view the invention comprises a hollow shaft with its main portion formed by radial wings which serve the purpose of holding the separator disks in place while allowing a free path of travel for the cream along the outside of the feed tube and being sufficiently spaced apart to allow of a cleaning cloth being entered between them for cleaning purposes.

The invention further consists in the hollow shaft for centrifugal separators herein claimed and all equivalents.

Referring to the accompanying drawings in which like characters of reference indicate the same parts in the different views: Figure 1 is a sectional elevation of a separator bowl provided with a hollow shaft constructed in accordance with this invention; Fig. 2 is an elevation of a hollow shaft with parts broken away; Fig. 3 is a plan view of the hollow shaft inverted; and, Fig. 4 is a sectional plan view on the plane of line 4—4 of Fig. 2.

In these drawings 10 indicates a separator bowl and 11 is the conical cap which fits thereon with a telescoping flange 12 entering the mouth of the bowl and forming a seal joint therewith by means of an interposed rubber gasket 13, the cap being tightly clamped upon the bowl by means of a feed tube 14 which is shouldered to engage the upper end of the cap and which is threaded into a boss 15 in the bottom of the bowl as a clamping bolt. Through the feed tube the whole milk is admitted to the separator bowl from the nozzle 16 of a stationary funnel which projects into its upper end, there being outlets for the milk into the lower part of the bowl by means of openings 17 in the feed tube and openings 18 in the boss 15. The hollow shaft of this invention fits around the feed tube and comprises a number of radial ribs or wings 19, preferably three as shown, which at their upper ends connect with a short tube 20 and at their outwardly bent lower ends connect with a base 21 of a hollow truncated cone shape. The base 21 rests on the bottom of the bowl 10 and one of the ribs has a shoulder 22 which fits in a recess of the boss 15 to key the hollow shaft to the bowl, while a notch 23 in the top of the tube 20 serves a similar purpose by fitting on a lug 24 of the cap 11, thus assuring the parts being assembled each time in the same relative positions to preserve the exact balancing of the separator bowl.

The frusto-conical sheet metal disks 25 are assembled one above the other on the hollow shaft, being provided with notches extending from their central openings to receive the ribs 19, and being spaced apart in any suitable manner to provide declining separating spaces between them. Through these spaces the separation of the liquid is accomplished by centrifugal action, the lighter portion, the cream, passing upwardly at the middle portion of the bowl, around the feed tube 14 and between the ribs 19 to discharge through an opening 26 in the cap 11 while the heavier portion, the skimmed milk, is driven outwardly to the walls of the bowl from which it travels upwardly through a tube 27 and out through an opening 28. One of the ribs 19 is provided with a flange 29 to form a key to fit in key-ways of the separator disks and assure their being assembled in the same relative positions on the hollow shaft.

By means of the hollow shaft with the radial ribs, as constructed under the present invention, there are no difficult places for cleaning, all parts being freely accessible, particularly the intermediate portion consisting of the ribs only. The ribs are so spaced that the cleaning cloth may be entered between them to reach every part thereof without the least difficulty. The tubular portion 20 is so short that it is entirely within reach of the cleaning cloth and may be quickly and easily cleaned as well as the conical base.

Aside from the feature of the hollow shaft being readily cleanable the radial ribs thereof serve as wings for giving the circular motion of the bowl to the milk as it is discharged from the openings of the feed tube and thus more quickly set it in action.

What I claim as my invention is;

In a centrifugal separator, a hollow shaft comprising radially arranged ribs with outwardly bent lower ends, a frusto-conical base mounted on the outwardly bent ends of the ribs, a bowl in which the outer edge of the base is seated to form a pocket therein for collecting impurities from the liquid, a tube connecting the upper ends of the ribs, a boss in the bottom of the bowl, a feed tube extending down between the ribs and fitting in the boss, there being passageways through the boss leading from the feed tube to the pocket within the base and there being a space between the upper edge of the base and the feed tube through which the liquid may pass between the ribs, a projection on one of the ribs engaging the boss for keying the hollow shaft to the bowl, and separator disks mounted on the ribs and spaced thereby from the feed tube to receive the liquid passing between the ribs and between the upper edge of the base and the feed tube.

In testimony whereof, I affix my signature, in presence of two witnesses.

CHARLES H. SHAW.

Witnesses:
R. S. C. CALDWELL,
ANNA F. SCHMIDTBAUER.